United States Patent
Leibovics et al.

(10) Patent No.: US 9,757,660 B2
(45) Date of Patent: Sep. 12, 2017

(54) ACTIVITY ARCH

(71) Applicant: Tiny Love Ltd., Tel Aviv (IL)

(72) Inventors: Daniel Leibovics, Netanya (IL); Frederik Meir Aboukrat, Hod Hasharon (IL)

(73) Assignee: TINY LOVE LTD., Tel Aviv (IL)

( * ) Notice: Subject to any disclaimer, the term of this patent is extended or adjusted under 35 U.S.C. 154(b) by 0 days.

(21) Appl. No.: 14/817,751

(22) Filed: Aug. 4, 2015

(65) Prior Publication Data

US 2016/0038850 A1 Feb. 11, 2016

Related U.S. Application Data

(60) Provisional application No. 62/033,295, filed on Aug. 5, 2014.

(51) Int. Cl.
*A63H 33/00* (2006.01)
*F16M 13/04* (2006.01)

(52) U.S. Cl.
CPC ......... *A63H 33/006* (2013.01); *A63H 33/007* (2013.01); *F16M 13/04* (2013.01)

(58) Field of Classification Search
USPC ............... 446/227; 434/247, 258; 5/655; 248/102, 103, 105, 163.2
See application file for complete search history.

(56) References Cited

U.S. PATENT DOCUMENTS

| | | | | |
|---|---|---|---|---|
| 2,282,881 A | * | 5/1942 | Ostrow | A63H 33/006 211/105.2 |
| 2,723,856 A | * | 11/1955 | Thomson | A63H 33/006 446/227 |
| 4,627,588 A | * | 12/1986 | Block | A63H 33/006 248/105 |
| 4,664,640 A | * | 5/1987 | Shindo | A63H 33/006 446/227 |
| 4,722,713 A | * | 2/1988 | Williams | A63H 33/00 248/102 |
| 5,478,268 A | * | 12/1995 | Au | A63H 33/006 446/227 |
| 6,113,455 A | * | 9/2000 | Whelan | A63H 33/006 248/214 |
| 6,640,985 B1 | * | 11/2003 | Cheng | A63H 33/006 211/118 |

(Continued)

FOREIGN PATENT DOCUMENTS

| | | |
|---|---|---|
| CN | 202043502 U | 11/2011 |
| JP | 2013172707 A | 9/2013 |

OTHER PUBLICATIONS

International Preliminary Report on Patentability and Written Opinion of the International Searching Authority PCT/IL2015/050359 mailed Oct. 12, 2016.

*Primary Examiner* — Kurt Fernstrom
(74) *Attorney, Agent, or Firm* — Dorsey & Whitney LLP (57) ABSTRACT

According to one aspect of the presently disclosed subject matter, there is provided an infant activity apparatus including a first arch extending between first and second ends thereof, and a second arch extending between first and second ends thereof, where the first ends are articulated to a first coupling element, and the second ends are articulated to a second coupling element, and where each of the coupling elements facilitates independent pivoting of the ends articulated thereto.

11 Claims, 5 Drawing Sheets

(56) References Cited

U.S. PATENT DOCUMENTS

| | | | |
|---|---|---|---|
| 7,037,170 B2* | 5/2006 | Pacella | A63H 33/006 446/227 |
| 7,040,585 B2* | 5/2006 | Cheng | A47D 13/063 135/125 |
| 7,290,303 B2* | 11/2007 | Mead | A47D 13/08 5/640 |
| 7,376,993 B2* | 5/2008 | Myers | A47D 13/063 5/655 |
| 8,795,023 B2* | 8/2014 | Elson | A63H 33/006 446/227 |
| 9,011,196 B2* | 4/2015 | Weisman | A63H 33/006 446/227 |
| 2002/0042953 A1* | 4/2002 | Matthews Brown | A47D 13/08 5/655 |
| 2004/0077269 A1 | 4/2004 | Oren et al. | |
| 2004/0242118 A1* | 12/2004 | Schreiber-Setzemski | A47D 15/003 446/227 |
| 2004/0266312 A1* | 12/2004 | Oren | A45D 42/16 446/227 |
| 2005/0172411 A1* | 8/2005 | Snedeker | A47D 13/02 5/655 |
| 2011/0275273 A1 | 11/2011 | Oren et al. | |

* cited by examiner

ACTIVITY ARCH

TECHNOLOGICAL FIELD

The presently disclosed subject matter relates to infant activity apparatuses, in particular those comprising one or more arches designed to be suspended above an infant.

BACKGROUND ART

There are known activity apparatuses often used as infant development and amusing toys for an infant lying on the floor or in a cradle, or when sitting in a stroller or a bouncer.

US Application Publication 2011/0275273 discloses an infant activity apparatus comprising two or more arches configured for creating an activity space therebelow defined by a location of articulation of the arches, and further comprising an arch configuration member configured for displacement between different articulation configurations of the arches by sliding with respect to at least one arch and further configured for retaining the arches at any desired articulation configuration, altering thereby the activity space.

US Application Publication 2004/077269 discloses a play arch attachable to the chair of a stroller having space-apart side. The arch is an elongated strip of rigid though pliable plastic material and has a length greater than the distance between the sides of the chair. The arch is formed with a plurality of non-bendable segments which are interconnected by bendable integral hinges and comprises a coupler fitted at either end of the strip to connect the strip to the sides of the chair to cause the strip to assume the curvature of an arch.

SUMMARY

According to one aspect of the presently disclosed subject matter, there is provided an infant activity apparatus comprising a first arch extending between first and second ends thereof, and a second arch extending between first and second ends thereof, wherein the first ends are articulated to a first coupling element, and the second ends are articulated to a second coupling element, and wherein each of the coupling elements facilitates independent pivoting of the ends articulated thereto.

Each of the coupling elements may comprise a stop-arrest arrangement facilitating incremental pivotal displacement of the arches.

The first arch may have a length between its ends which is longer than the length of the second arch between its two ends.

The coupling elements may be configured for disposing the second arch under the first arch.

The coupling elements may be configured for facilitating pivoting the arches such that they are disposed at an angle of about 150° from each other about an axis passing through the coupling elements. They may be further configured for facilitating pivoting the arches such that they are disposed at an angle of about 180° from each other about the axis.

The infant activity apparatus may comprise at least one additional arch, extending between a first auxiliary end articulated to the first coupling element, and a second auxiliary end articulated to the second coupling element, the coupling elements facilitating independent pivoting of the auxiliary ends from each of the first and second ends of the first and second arches.

At least one of the arches may comprise one or more decorative elements.

Each of the arches may comprise one or more decorative elements, wherein:
at least one of the decorative elements connected to a first of the arches is designed to stimulate activity of an infant's legs; and
at least one of the decorative elements connected to a second of the arches is designed to stimulate at least one of:
activity of an infant's hands; and
at least one sensory faculty of an infant.

The sensory faculty may be one of sight and hearing.

At least one of the decorative elements may be detachably connected to the arch.

At least one of the decorative elements may be an integrated decorative element.

The infant activity apparatus may further comprise mounting arrangements attached to the coupling elements, the mounting arrangement being configured to facilitate mounting of the apparatus to an external object.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
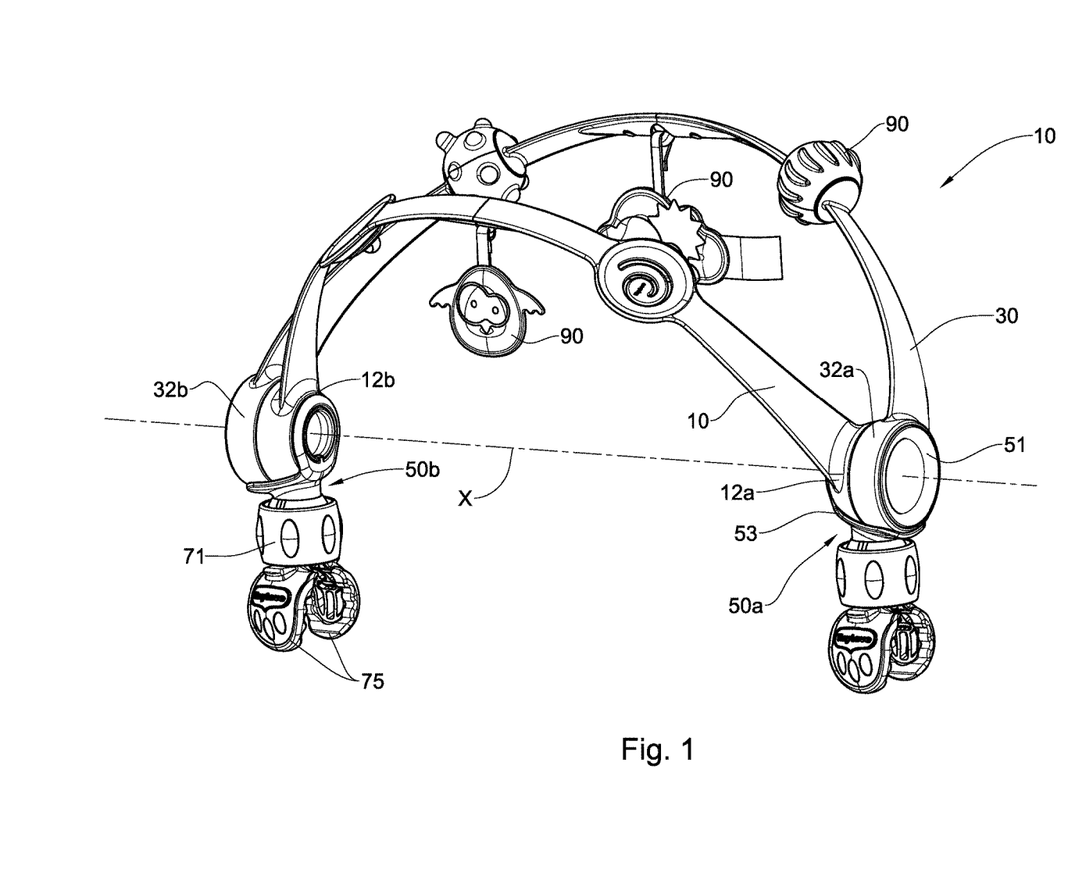
FIG. 1 is a perspective view of an infant activity apparatus according to the presently disclosed subject matter.

As illustrated in FIG. 1, there is provided an infant activity apparatus generally designated 1, comprising a first arch 10 and a second arch 30, first and second coupling arrangements 50a, 50b (hereafter, the coupling arrangement may be referred to collectively using reference numeral 50) defining therebetween a primary axis X, a pair of mounting arrangements 70, and a plurality of decorative elements 90.

The first arch 10 spans between a first end 12a and a second end 12b. The second arch 30 spans between a first end 32a and a second end 32b thereof. The respective first ends 12a, 32a of the arches 10, 30 are pivotally articulated to the first coupling arrangement 50a, and the respective second ends 12b, 32b of the arches are pivotally articulated to the second coupling arrangement 50b.

Figure 2:
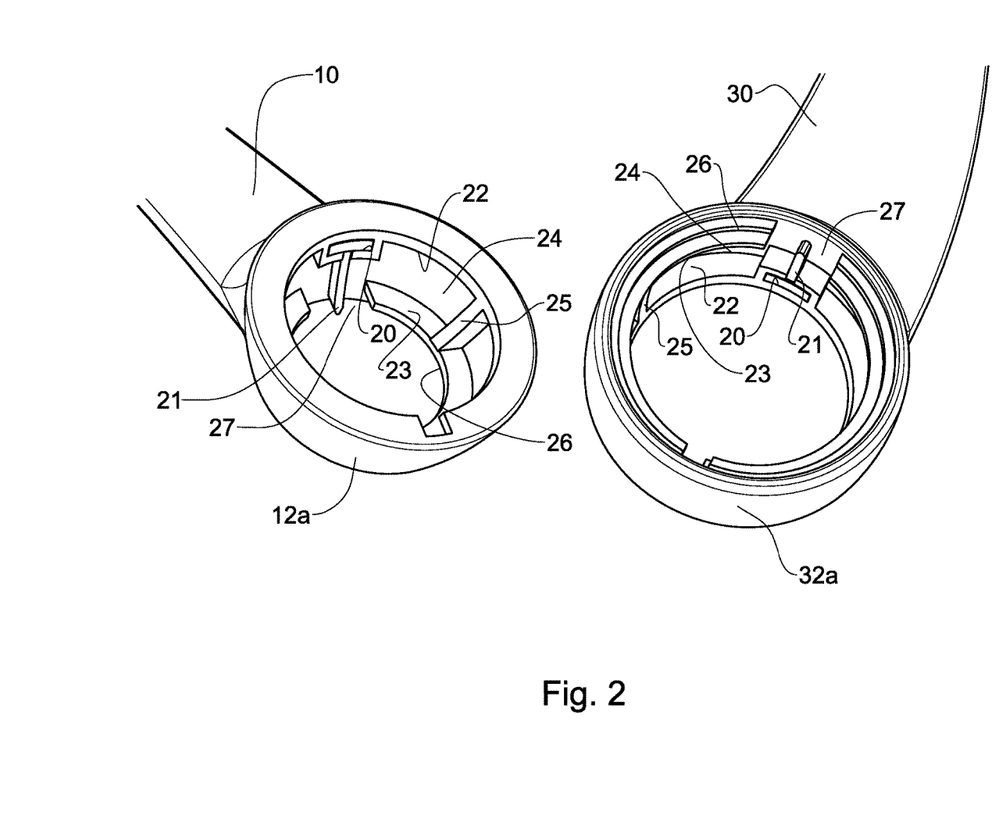
FIG. 2 is an exploded view of ends of arches of the activity apparatus illustrated in FIG. 1.

As seen in FIG. 2, each of the ends 12a, 32a and 12b and 32b (only the first ends 12a, 32a are illustrated in FIG. 2) are generally ring shaped about the primary axis X (not illustrated in FIG. 2). An interior side of each is formed with a socket 20 containing therewithin an arresting pin 21, the purpose of which will be described hereinbelow. The interior sides are each formed with inner and outer circular panels 22, 23, defining a space 24 therebetween. Two stoppers 25 are provided traversing the space 24 between the two panels 22, 23 of each of the ends 12a, 32a and 12b and 32b. The outer panels 23 each define a seat 26 for the coupling arrangement 50, as will be described below. Each of the panels 22 is formed with an opening 27, through which the arresting pins 21 protrude.

Figure 3A:
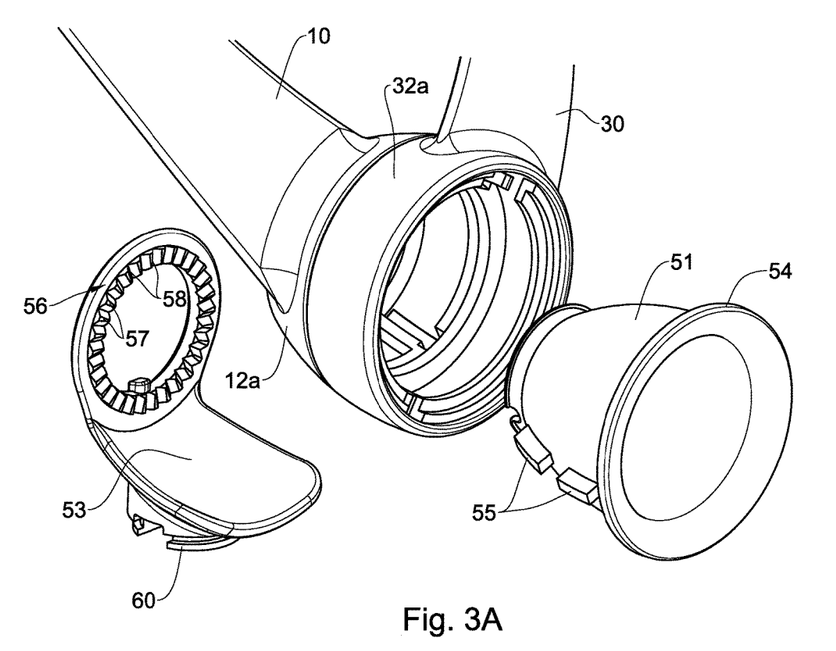
FIG. 3A is an exploded view of a coupling arrangement of the activity apparatus illustrated in FIG. 1 and the ends of the arches illustrated in FIG. 2.
Figure 3B:
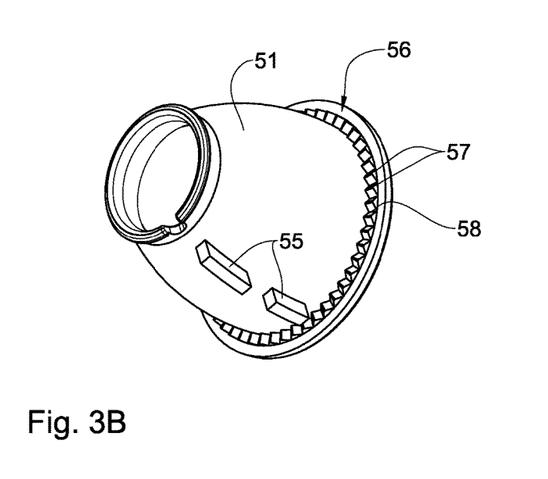
FIG. 3B is a perspective view of a pivot hub of the coupling arrangement illustrated in FIG. 3A, shown from a reverse perspective.
Figure 4A:
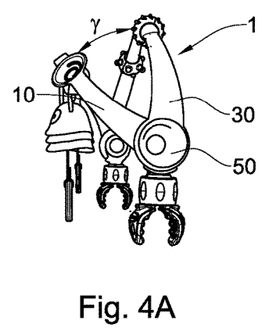
FIGS. 4A through 4H are side perspective views of the activity apparatus illustrated in FIG. 1, with arches thereof in different positions.
Figure 4B:
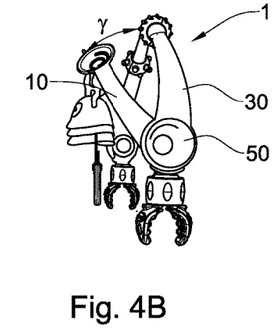
Figure 4C:
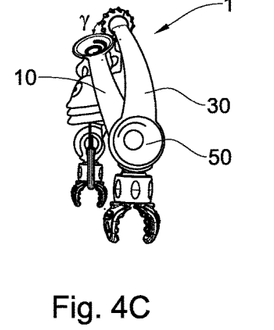
Figure 4D:
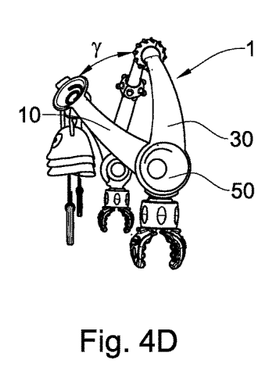
Figures 4E, 4F:
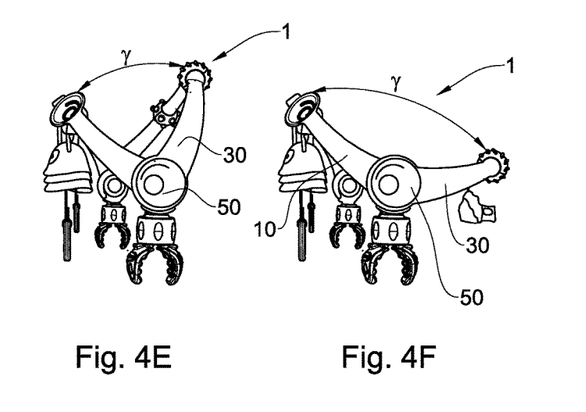
Figure 4G:
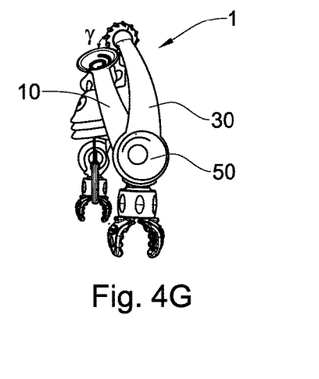
Figure 4H:
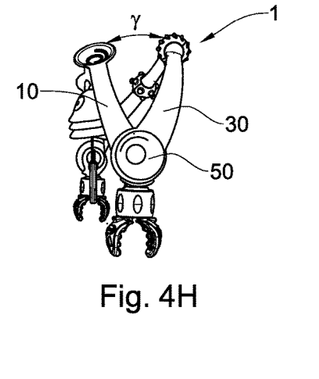

Reverting to FIG. 1, each of the coupling arrangements 50 comprises a pivot hub 51 and a fastener element 53. As illustrated in FIG. 3A, the pivot hub 51 has a round cross-section formed about the primary axis X (not illustrated), for example having a generally frustoconical shape, formed so as to fit within the interior of the ends 12a, 32a and 12b and 32b of the arches 10, 30, thereby facilitating rotation of each of the ends thereabout. It comprises an outer rim 54, and two blocks 55 projecting from the body thereof. The outer rim 54 projects radially outwardly from the primary axis X, facilitating retention of the arches 10, 30 by the coupling arrangement when assembled As seem in FIG. 3B, it further comprises a denticulate arresting ring 56 comprising a plurality of teeth 57 protruding inwardly therefrom and defining therebetween a plurality of notches 58.

Reverting to FIG. 3A, the fastener element 53 comprises an attachment portion 60 projecting downwardly therefrom, configured to attach is to the mounting arrangement 70. It further comprises a denticulate arresting ring 56 formed about the primary axis X (not illustrated) and comprising a plurality of teeth 57 protruding inwardly therefrom and defining therebetween a plurality of notches 58. (As the arresting rings 56 of the pivot hubs 51 and fastener elements 53 are similarly constructed and operate similarly, the same reference numerals have been used.)

Each of the arresting rings 56 is disposed such that the teeth 57 thereof is disposed within the seat 56 formed on the interior of one of the ends 12a, 32a and 12b and 32b, as described above, with the end of the respective arresting pin 21 being within one of the notches 58. Thus, each arresting pin 21 and arresting ring 56 together constitute a stop-arrest arrangement, facilitating incremental pivotal displacement of each of the arches 10, 30 about the axis X.

In use, each of the arches 10, 30 may be independently pivoted about the primary axis X. As the arches 10, 30 are thus pivoted, each of the blocks 55 slides within one of the spaces 24, defined between the panels 22, 23 of the ends 12a, 32a and 12b and 32b, as described above. The stoppers 25 define the maximum pivoting range of each of the arches 10, 30, and thus the maximum angle γ (as described below with reference to FIGS. 4A through 4H) which can be formed therebetween, i.e., when each of the arches is pivoted, in opposite directions, as is provided by the stoppers. For example, the stoppers 25 may define a maximum angle γ of at least about 150°. According to some examples, the maximum angle γ is at least about 180°. The stop-arrest arrangement described above facilitates independently arresting each of the arches 10, 30 at one of a plurality of positions (defined by the respective arresting ring 56) within the range defined by the stoppers 25.

As seen in FIGS. 4A through 4H, the independent pivoting of the arches 10, 30 facilitates arranging the activity apparatus 1 is a wide variety of positions (for reference, coupling arrangements 50 is illustrated). For example, the second arch 30 may be maintained in a position (e.g., substantially vertically, as shown), while the first arch 10 is pivoted independently, e.g., as illustrated in the progression from FIG. 4A through 4C, thereby changing an angle γ therebetween. Similarly, the first arch 10 may be maintained in a position, while the second arch 30 is pivoted independently, e.g., as illustrated in the progression from FIG. 4D through 4F, thereby changing the angle γ therebetween. Furthermore, both arches 10, 30 may be moved in different directions independently, e.g., as illustrated in the progression from FIG. 4G to 4H, thereby changing the angle γ therebetween.

Figure 5:
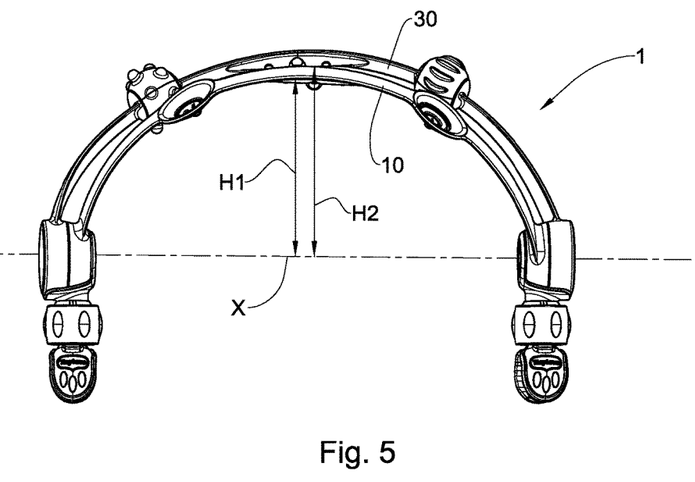
FIG. 5 is a front view of the activity apparatus illustrated in FIG. 1.

As best seen in FIG. 5, the arches 10, 30 may be formed such that one has a length which is less than the other, resulting in, e.g., the first arch 10 having a height H1 which is shorter than a height H2 of the second arch 30. According to this arrangement, the first arch 10 may pass below the second arch 30, for example to lie parallelly thereto, or to facilitate switching the relative positions of the arches 10, 30 without the need to rotate the entire activity apparatus 1.

The activity apparatus 1 may comprise additional arches (e.g., a third arch, a fourth arch, etc., not shown), each designed similarly to the first and second arches 10, 30 as described above, mutatis mutandis. According to this example, the elements of the coupling arrangements 50 are suitably modified to accommodate the extra arches.

As described above, one or both of the arches 10, 30 may be provided with one or more decorative elements 90, which may comprise colors, patterns, textures, etc., for example selected to stimulate an infant. The decorative elements 90 may be configured to dangle, or be articulated directly to the arch body, such as beads attached thereto. Some or all of the decorative elements 90 may be detachably attachable to its respective arch. Some or all of the decorative elements 90 may be integrated with its respective arch.

The activity apparatus 1 may be configured to stimulate activity of an infant and enhance hands and legs motion and coordination. For example, one of the arches 10, 30 may comprises one or more decorative elements 90 designed to stimulate at least one of activity of an infant's hands, sensory faculties (such as sight and/or hearing), etc., with the other of the arches comprising one or more decorative elements designed to stimulate activity of the infant's legs.

Figure 6:
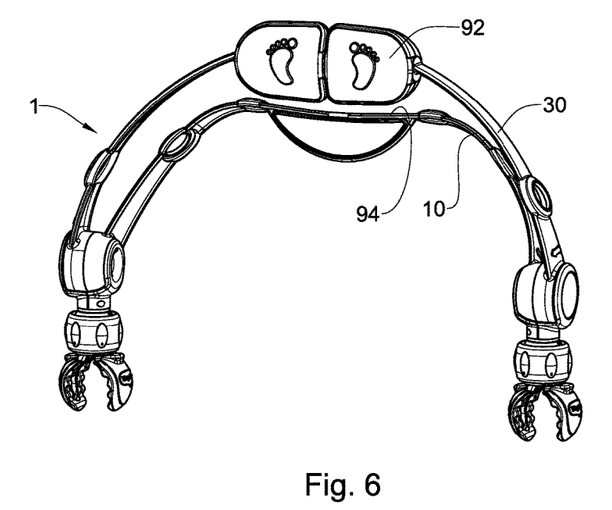
FIG. 6 is a perspective view of another example of an infant activity apparatus according to the presently disclosed subject matter.

As seen in FIG. 6, one or both of the arches 10, 30 may be formed with an integrated decorative element 92, constituting a portion of the arch spanning between its two ends. Furthermore, one or both of the arches 10, 30 may comprise a linear portion 94, i.e., a portion of one or both of the arches may be non-curved. An activity apparatus according to the presently disclosed subject matter may comprise one or both of the features described with respect to FIG. 6 (i.e., the integrated decorative element 92 and the linear portion 94 of the arch), and/or may comprise any one or more of the features described above with respect to FIGS. 1 through 4.

Reverting to FIG. 1, the mounting arrangements 70 facilitate detachably attaching the activity apparatus 1 to an external object, such as a crib, a bed, a bouncer, a safety seat, a cradle, a stroller, etc. Accordingly, it comprises a pair of clamps 75. The distance between the clamps 75 may be adjustable by rotation of a rotating ring 71, thereby facilitating adapting the mounting arrangement 70 to grip external objects of different sizes.

The arches 10 and 30 may be made of a rigid though pliable material, such as for example plastic, providing them with flexibility allowing them to assume different bending states, owing to the distance between the two opposite coupling ends 50 while the activity apparatus 1 is attached to different width of infant equipment thereof.

In addition, due to resiliency of the arches, the activity apparatus 1 may be temporarily and reversibly deformed into a compact position, thereby, e.g., facilitating transporting it.

Each of the arches 10, 30 may be formed with any suitable generally arched shape spanning between its respective ends. For example, one or both of the arches 10, 30 may have a wave shape.

According to a particular configuration, elements of the first arch can interact with elements of the second arch. For example, elements of one arch can have a shape complimentary to the shape of elements of the other arch, whereby when the two arches lie in registration with one another, the shape of two neighboring toys yields a different shape or configuration. Furthermore, there may be an interacting relation between toys and arches by providing proximity-activated elements whereby when such elements near each other an audio signal may be played optionally with lighting of LEDs, etc.

Those skilled in the art to which this invention pertains will readily appreciate that numerous changes, variations and modifications can be made without departing from the scope of the invention mutatis mutandis.

The invention claimed is:

1. An infant activity apparatus, comprising:
   a first arch extending between a first-arch-first-end and a first-arch-second-end; and
   a second arch extending between a second-arch-first-end and a second-arch-second-end, wherein the first arch has a length between the first-arch-first-end and a first-arch-second-end which is shorter than the length of the second arch between the second-arch-first-end and a second-arch-second-end,
   said first-arch-first-end and said second-arch-first-end are articulated to a first coupling element, and said first-arch-second-end and said second-arch-second-end are articulated to a second coupling element, each of said first and second coupling elements facilitates independent pivoting of arch ends articulated thereto about a common axis, and said coupling elements being configured for passing the first arch under the second first arch from one side thereof to the other.

2. The infant activity apparatus according to claim 1, wherein each of said first and second coupling elements comprises a stop-arrest arrangement facilitating incremental pivotal displacement of said arches.

3. The infant activity apparatus according to claim 1, wherein said coupling elements are configured for facilitating pivoting said arches such that they are disposed at an angle of about 150° from each other about the common axis passing through said coupling elements.

4. The infant activity apparatus according to claim 3, wherein said coupling elements are configured for facilitating pivoting said arches such that they are disposed at an angle of about 180° from each other about the common axis.

5. The infant activity apparatus according to claim 1, comprising at least one additional arch, extending between a first auxiliary end articulated to said first coupling element, and a second auxiliary end articulated to said second coupling element, said coupling elements facilitating independent pivoting of said auxiliary ends from each of the ends of the first and second arches.

6. The infant activity apparatus according to claim 1, wherein at least one of said first arch and said second arch comprises one or more decorative elements.

7. The infant activity apparatus according to claim 6, wherein each of said first arch and said second arch further comprises one or more decorative elements, wherein at least one of said decorative elements is connected to a first of said arches and is designed to stimulate activity of an infant's legs; and at least one of said decorative elements is connected to a second of said arches and is designed to stimulate at least one of: activity of an infant's hands, and at least one sensory faculty of an infant.

8. The infant activity apparatus according to claim 7, wherein the sensory faculty is one of sight and hearing.

9. The infant activity apparatus according to claim 6, wherein at least one of said decorative elements is detachably connected to the arch.

10. The infant activity apparatus according to claim 6, wherein at least one of said decorative elements is an integrated decorative element.

11. The infant activity apparatus according to claim 1, further comprising mounting arrangements, wherein a mounting arrangement is attached to each of said first and said second coupling elements, said mounting arrangements being configured to facilitate mounting of the apparatus to an external object.

\* \* \* \* \*

UNITED STATES PATENT AND TRADEMARK OFFICE
CERTIFICATE OF CORRECTION

PATENT NO. : 9,757,660 B2
APPLICATION NO. : 14/817751
DATED : September 12, 2017
INVENTOR(S) : Daniel Leibovics et al.

Page 1 of 1

It is certified that error appears in the above-identified patent and that said Letters Patent is hereby corrected as shown below:

In the Claims

In Column 5, Line 42, delete "second first" and insert --second--, therefor.

Signed and Sealed this
Twenty-fourth Day of April, 2018

Andrei Iancu
*Director of the United States Patent and Trademark Office*